ized the inside of the Tannis inside a tampa Tamura was Nari Tal  Hara TIT Tar  Tal  a Till  UTA ONA  US010161544B2

(12) United States Patent
Karau

(10) Patent No.: US 10,161,544 B2
(45) Date of Patent: Dec. 25, 2018

(54) CORROSION PROTECTION FOR CAST IRON PIPES AND METHOD FOR PRODUCING SAME

(71) Applicant: DUKTUS ROHRSYSTEME WETZLAR GMBH, Wetzlar (DE)

(72) Inventor: Friedrich Karau, Wetzlar (DE)

(73) Assignee: DUKTUS ROHRSYSTEME WETZLAR GMBH, Wetzlar (DE)

( * ) Notice: Subject to any disclaimer, the term of this patent is extended or adjusted under 35 U.S.C. 154(b) by 451 days.

(21) Appl. No.: 14/862,379

(22) Filed: Sep. 23, 2015

(65) Prior Publication Data

US 2016/0009597 A1 Jan. 14, 2016

Related U.S. Application Data

(63) Continuation of application No. PCT/EP2014/055684, filed on Mar. 21, 2014.

(30) Foreign Application Priority Data

Mar. 25, 2013 (DE) .................. 10 2013 103 038

(51) Int. Cl.
| | | |
|---|---|---|
| *F16L 9/153* | (2006.01) | |
| *F16L 9/08* | (2006.01) | |
| *F16L 9/133* | (2006.01) | |
| *B32B 1/08* | (2006.01) | |
| *B05D 1/30* | (2006.01) | |
| *B05D 1/26* | (2006.01) | |
| *C04B 28/06* | (2006.01) | |
| *F16L 58/06* | (2006.01) | |
| *F16L 1/036* | (2006.01) | |
| *B05D 1/02* | (2006.01) | |
| *C04B 24/26* | (2006.01) | |
| *F16L 9/02* | (2006.01) | |
| *F16L 9/14* | (2006.01) | |
| *C04B 111/00* | (2006.01) | |

(52) U.S. Cl.
CPC .............. *F16L 9/153* (2013.01); *B05D 1/02* (2013.01); *B05D 1/26* (2013.01); *B05D 1/265* (2013.01); *B05D 1/30* (2013.01); *B32B 1/08* (2013.01); *C04B 24/2682* (2013.01); *C04B 28/06* (2013.01); *F16L 1/036* (2013.01); *F16L 9/02* (2013.01); *F16L 9/08* (2013.01); *F16L 9/133* (2013.01); *F16L 9/14* (2013.01); *F16L 58/06* (2013.01); *C04B 2111/00482* (2013.01); *C04B 2111/00525* (2013.01); *C04B 2111/00577* (2013.01)

(58) Field of Classification Search
CPC ..... F16L 9/02; F16L 9/04; F16L 9/042; F16L 9/045; F16L 9/08; F16L 9/12; F16L 9/133; F16L 9/14; F16L 9/153; F16L 9/16; F16L 9/165; F16L 9/18; F16L 58/1009; F16L 58/1027; F16L 58/1045; F16L 58/1054; F16L 58/1072; F16L 58/109; B32B 1/08; C04B 24/005; C04B 24/121; C04B 24/24; C04B 24/26; C04B 24/2611; C04B 24/2652; C04B 24/2682; C04B 24/223; C04B 24/42; C04B 24/425; C04B 26/04; C04B 26/08; C04B 26/125; B29C 39/10; B29C 47/02; B29C 51/16; B29C 53/56; B29C 53/562; B29C 53/58; B29C 63/06; B29C 63/08; B29C 63/10; B29C 63/12; B29C 63/14; B05D 1/02; B05D 1/26; B05D 1/265; B05D 1/30
See application file for complete search history.

(56) References Cited

U.S. PATENT DOCUMENTS

| | | |
|---|---|---|
| 5,585,141 A | 12/1996 | Loving et al. |
| 5,955,162 A | 9/1999 | Loving et al. |
| 6,569,923 B1 | 5/2003 | Slagter |

FOREIGN PATENT DOCUMENTS

| | | |
|---|---|---|
| CN | 1955139 A | 5/2007 |
| CN | 105189404 A | 12/2015 |
| DE | 832 799 | 2/1952 |
| DE | 26 20 669 A1 | 11/1977 |
| DE | 2449802 C3 | 8/1981 |
| DE | 695 18 998 T2 | 2/2001 |
| DE | 60034674 T2 | 1/2008 |
| DE | 102013103038 A1 | 9/2014 |
| EP | 0 526 354 A1 | 2/1993 |
| FR | 2 784 048 | 4/2000 |
| GB | 1141406 | 1/1969 |
| GB | 1488680 A | 10/1977 |
| GB | 2 206 344 A | 1/1989 |
| WO | WO 00/56679 | 9/2000 |
| WO | WO-2014154573 A1 | 10/2014 |

OTHER PUBLICATIONS

El-Hemaly et al.; Evaluation of the internal high alumina cement mortar lining of ductile cast iron pipes used in sewage transportation; accepted May 2, 2007; pp. 1280-1283.
XP-002727784; Stark et al.; Zement and Kalk; Dec. 31, 2000; pp. 123-125.
XP-002727785; Scrivener et al.; Calcium Aluminate Cements; Dec. 31, 2002; pp. 716-719.
International Search Report for PCT/EP2014/055684; dated Jul. 8, 2014; 3 pp.
Examination Report from German priority application dated Jan. 20, 2014; 5 pp.

(Continued)

*Primary Examiner* — Walter Aughenbaugh
(74) *Attorney, Agent, or Firm* — Harness, Dickey & Pierce, P.L.C.

(57) ABSTRACT

The invention relates to corrosion-protected ductile cast iron pipes, a method for producing corrosion-protected ductile cast iron pipes, and the use of specific compositions for producing corrosion-protected ductile cast iron pipes. More particularly, the invention relates to corrosion protection for ductile cast iron pipes using latex-modified cement mortars based on calcium-aluminum cements.

30 Claims, No Drawings

(56) References Cited

OTHER PUBLICATIONS

English language translation of International Preliminary Report on Patentability (Chapter 1) for PCT/EP2014/055684; dated Sep. 29, 2015; 10 pp.
Chinese Office Action, with English translation, for Appl'n No. 201480018292.X; dated Aug. 12, 2016; 9 pp.
Chinese Office Action, with English translation, for App. No. 201480018292.X; dated Aug. 12, 2016; 9 pp.
Examination Report from German priority application dated Jan. 20, 2014; 5 pp (English summary only).

CORROSION PROTECTION FOR CAST IRON PIPES AND METHOD FOR PRODUCING SAME

CROSS-REFERENCES TO RELATED APPLICATIONS

This application is a continuation of international patent application PCT/EP2014/055684, filed on Mar. 21, 2014 designating the U.S., which international patent application has been published in German language and claims priority from German patent application DE 10 2013 103 038.6, filed on Mar. 25, 2013. The entire contents of these priority applications are incorporated herein by reference.

BACKGROUND OF THE INVENTION

The present invention relates to corrosion-protected ductile cast iron pipes, a method for the production thereof and also the use of specific compositions for producing corrosions-protected ductile cast iron pipes.

Ductile sleeved cast iron pipes have been used for a long time, e.g. for mains water and wastewater conduits. Ductile sleeved cast iron pipes are tubes made of cast iron and have to be provided with corrosion protection in order to increase their life owing to the fact that the tubes are in most cases laid underground when they are used. Ductile pipes laid underground are constantly in contact with a corrosive environment, i.e. the moist earth. In addition, during their use they come into contact with potentially corrosive materials, in the case of mains water, oxygen-containing water, in the case of mineral water, possibly acidic water, and in the case of wastewater, water which may contain further corrosive substances, e.g. of biological origin.

At present, it is mainly two methods which are used in the technical field to provide corrosion protection for ductile pipes.

The first method is based on the pipes being coated in a first step with an electrochemically active layer, usually of zinc, and in a second step with a second protective layer, e.g. composed of bitumen or of synthetic resin, with the latter usually consisting of epoxy resins or else of polyurethane. A modification of this method of providing corrosion protection consists of coating the pipes without prior zinc coating with a bitumen layer or a polymer layer which can consist of the abovementioned materials or else of polyethylene or the like.

Although this method has the advantage that the corrosion protection can be achieved using very thin layers, it at the same time has the disadvantage that the layers achieved in this way have a relatively low resistance to mechanical stresses, e.g. impacts but also cut-like damage. The use of very thin layers is advantageous with a view to the weight increase of the pipes and also further processing, in particular in the case of use of longitudinal adhesive sealing and connecting systems. The disadvantage reside in that increased care has to be taken when processing such pipes, since even damage to the corrosion protection in a relatively small region can lead to the pipe corroding within a considerably shorter time than the life expected and thus leaking or bursting. Furthermore, it has the disadvantage that considerable solvent emissions can sometimes arise during production. Coating with a polymer without prior zinc coating also has the disadvantage that the pipes have to be sand-blasted or chemically pickled in an appropriate way or pretreated in another complicated way after they have been produced in order to apply a firmly adhering corrosion protection, which makes the method more complicated and thus also more expensive.

A second method of providing corrosion protection on ductile cast iron pipes is application of a layer of a cement mortar, with an electrochemically active layer once again optionally being able to be applied, in particular on the outside between the cement mortar and the cast iron pipe.

Even though this method leads to coatings which have a significantly higher mechanical strength than is the case for polymer coatings, this method has the disadvantage that the layers required are relatively thick due to the required mechanical stability. A further disadvantage is the porosity of the cement mortar and that, for example when using coupling sleeve connections, the coating has to be removed again at the ends of the pipes, which once again significantly increases the processing costs.

SUMMARY OF THE INVENTION

In the light of what has been said above, it would therefore be desirable to have a method by means of which ductile cast iron pipes can be surrounded by a corrosion-protection layer which has a better mechanical stability than can be achieved by means of the polymer-based methods but at the same time leads to a thinner layer than is the case with the conventional cement mortar processes known at present.

It has now surprisingly been found that when using latex-modified cement mortars based on calcium aluminate cements it is possible to form a corrosion-protection layer which adheres to ductile cast iron pipes and is, in particular, virtually crack-free and has a low porosity. In consequence, these layers can be applied in a significantly lower thickness than is the case for conventional cement mortar layers. In addition, the coatings based on latex-modified cement mortars based on calcium aluminate cements display excellent adhesion to surfaces of ductile cast iron pipes, in particular to the scale layers resulting from the casting process, so that these coatings also can be applied without further treatment to ductile cast iron pipes and display excellent adhesion there. The coatings based on latex-modified cement mortars also additionally display excellent adhesion to zinc-coated surfaces. The layers produced in this way also additionally display excellent mechanical properties, in particular a high elasticity, impact resistance and cracking resistance. Therefore, they also readily withstand the usual stresses as are applied during laying of pipes. It has additionally been found that the layers produced in this way display a greater thermal stability and can withstand temperatures up to 150° C.

In conclusion, it can be said that latex-modified cement mortars based on calcium aluminate cements make it possible to obtain corrosion-protection layers which are thin enough for the pipes to be able to be used with coupling sleeves without removal of the corrosion-protection layer, so that these pipes have also been found to be simple to process during laying.

In one aspect, the invention thus provides a ductile cast iron pipe which has a coating of a latex-modified cement mortar on at least part of the inner and/or outer cylindrical surface, wherein the latex-modified cement mortar is a cement mortar based on calcium aluminate cement which, based on 100% by mass of dry cement, comprises the following:

- at least 5% by mass of $CaAl_2O_4$
- at least 5% by mass of $Ca_3Al_2O_6$
- at least one inorganic filler
- optionally one or more further aluminates and also optionally auxiliaries, secondary phases and amorphous components.

In a further aspect, the invention provides a method for producing a coated ductile cast iron pipe, which comprises the following steps:

provision of a ductile cast iron pipe and
coating of at least part of the inner and/or outer cylindrical surface of the ductile cast iron pipe with a latex-modified cement mortar, wherein the latex-modified cement mortar is a cement mortar based on calcium aluminate cement which based on 100% by mass of dry cement comprises the following:

at least 5% by mass of $CaAl_2O_4$
at least 5% by mass of $Ca_3Al_2O_6$
at least one inorganic filler
optionally one or more further aluminates and also
optionally auxiliaries, secondary phases and amorphous components.

In a further aspect, the invention thus provides for the use of a latex-modified cement mortar for coating ductile cast iron pipes, wherein the latex-modified cement mortar is a cement mortar based on calcium aluminate cement which based on 100% by mass of dry cement comprises the following:

at least 5% by mass of $CaAl_2O_4$
at least 5% by mass of $Ca_3Al_2O_6$
at least one inorganic filler
optionally one or more further aluminates and also
optionally auxiliaries, secondary phases and amorphous components.

DETAILED DESCRIPTION OF THE PREFERRED EMBODIMENTS

The cast iron pipe used for the purposes of the invention can be any cast iron pipe known to those skilled in the art. It can be in this case a pipe obtained directly after casting or a pipe which has been processed further, e.g. a pickled or sand-blasted pipe or a pipe which has been provided with an electrochemically active layer.

The expression "latex" refers, for the purposes of the invention, to a colloidal suspension or dispersion of polymer particles in water. A latex usually contains about 50% by weight of approximately spherical polymer particles in a size range from 0.01 µm to about 1 µm. The polymers used in the latex can be either elastomeric polymers or thermoplastic polymers, with elastomeric polymers generally being preferred. The polymers used in the latex can be of either natural or synthetic origin. Examples of such polymers which are suitable for producing a latex for the purposes of the invention include but are not restricted to the following: polyacrylates, polymers and copolymers based on butadiene, for example styrene-butadiene or butadiene-acrylate copolymers, polymers and copolymers based on styrene, for example styrene-acrylate copolymers, polyisoprene rubbers and also polychloroprene rubbers. In some embodiments of the invention, preference can be given to the latex being a latex based on polyisoprene rubber or polychloroprene rubber.

To produce the cement mortar used according to the invention, the dry cement used is mixed with the latex, with further additives optionally being added. The water present in the latex is usually sufficient to make up the cement mortar, but it is also possible for additional water to be added.

For the purposes of the invention, the expression inorganic fillers refers to any particulate, inorganic material which is suitable as aggregate for cement mortar. This material is usually a finely particulate material having an average particle diameter of 500 µm and less, preferably 100 µm and less. However, it is also possible, for example, for the filler to be in the form of short fibers, e.g. in the form of glass fibers or carbon fibers (also referred to as whiskers). The inorganic filler can be a synthetic or natural material, e.g. a mineral filler. Examples of suitable fillers include but are not restricted to the following: quartzes; basalts; granites; feldspar; fillers based on aluminum, for example fillers based on aluminum oxides or aluminosilicates; clays or clay minerals such as kaolinite, chrysotile, illite, smectite, vermiculite, chlorite, montmorillonite, beidellite, nontronite, saponite or bentonite; fillers based on oxides of silicon, titanium or boron; and fillers based on the oxides and silicates of zirconium. In some embodiments, preference can be given to the inorganic filler being a filler based on silicon and in particular based on $SiO_2$. Fillers based on $SiO_2$ can be fillers based on amorphous $SiO_2$, for example fillers based on kieselguhr or fillers based on crystalline $SiO_2$, for example quartz.

The cement mortar based on calcium aluminate cement can be a ready-mixed product or else be a specifically produced mixture. In some embodiments, the use of alumina cements as starting materials for the cement mortar based on calcium aluminate cement used for the purposes of the invention can be advantageous.

In addition to the abovementioned constituents, the cement mortar used according to the invention can comprise further generally known auxiliaries and additives. Examples of these include but are not restricted to the following: antifoams, surfactants, e.g. surfactants for stabilizing the latex, bonding agents, reinforcing fibers or polymers and polymer particles.

To apply the latex-modified cement mortar, it is possible use any method known in the technical field. Examples of such methods include the following: spray processes, casting processes, in particular centrifugal casting processes, and extrusion processes. The application of the cement mortar can optionally be followed by a step in which a nonwoven tape or a woven fabric tape, in particular a polymer woven fabric tape, is wrapped around at least part of the ductile cast iron pipe. In some embodiments, the cement mortar can preferably be applied by means of an extrusion process using a slit die. It can also be advantageous to apply the cement mortar by spray processes which are referred to as "airless" spray processes.

For the purposes of the present invention, the expression "comprise" or "comprising" refers to an open listing and does not rule out constituents or steps other than the constituents or steps which are expressly mentioned.

For the purposes of the present invention, the expression "consist of" or "consisting of" refers to a closed listing and rules out any constituents or steps other than the constituents or steps which are expressly mentioned.

For the purposes of the present invention, the expression "consist essentially of" or "consisting essentially of" refers to a partly closed listing and refers to compositions which apart from the constituents mentioned comprise only such further constituents which do not materially alter the character of the composition or are present in amounts which do not materially alter the character of the composition.

When, for the purposes of the present invention, a composition is described using the expression "comprise" or "comprising", this expressly includes compositions which consist of the constituents mentioned or consist essentially of the constituents mentioned.

In one embodiment, the cement mortar comprises 5-35% by mass, preferably 15-30% by mass, of $CaAl_2O_4$.

In one embodiment, the cement mortar comprises 5-35% by mass, preferably 5-10% by mass, of $Ca_3Al_2O_6$.

In one embodiment, the cement mortar comprises at least 20% by mass, preferably at least 40% by mass and in particular 60-70% by mass, of the at least one inorganic filler.

It has been found that the use of calcium aluminates and fillers in the abovementioned ranges leads to coatings which adhere particularly well.

In one embodiment of the invention, the latex-modified cement mortar is a cement mortar which has been modified with at least one latex selected from among polyisoprene latexes and polychloroprene latexes.

It has been found that the use of polyisoprene latexes and polychloroprene latexes for modifying the cement mortar leads to a coating which adheres particularly stably. Even though the applicant does not wish to be tied thereto, it is assumed that the use of polyisoprene latexes and polychloroprene latexes gives the coating particular elasticity.

In a further embodiment of the invention, the latex-modified cement mortar further comprises at least one melamine-formaldehyde resin.

It has been found that the additional incorporation of melamine-formaldehyde resins further assists the stability of the coating obtained; without being tied thereto, the applicant assumes that the addition of melamine-formaldehyde resin increases the cracking resistance of the coating obtained.

In a further embodiment of the invention, the latex-modified cement mortar further comprises at least one silane bonding agent.

It has been found that the adhesion of the coating to the ductile cast iron pipes can be improved further by the use of silane bonding agents. Even though the applicant does not wish to be tied to any theory, the applicant assumes that the use of silane bonding agents leads to a type of copolymerization, with the silanes firstly being capable of bonding to the cement phases and iron oxide phases of the scale, and also being able to interact with the polymers. This leads to an increase in strength and to an increase in the adhesion.

In a further embodiment of the invention, the coating has a thickness of not more than 2 mm, preferably not more than 500 μm.

It has been found that coatings having this thickness are advantageous both in respect of the further processing of the pipes and also in respect of a very small increase in weight, without the corrosion protection being impaired thereby.

In a further embodiment of the invention, the latex-modified cement mortar is applied by a method selected from the group consisting of spray processes, in particular "airless" spray processes, casting processes, in particular centrifugal casting processes, and extrusion processes.

It has been found that the abovementioned methods are particularly suitable for applying the cement mortar.

In a further embodiment of the invention, the coating step is followed by a step comprising wrapping of a nonwoven tape or a woven fabric tape, in particular a polymer woven fabric tape, around at least part of the ductile cast iron pipe.

It has been found that wrapping the coated cast iron pipe in a nonwoven tape or a woven fabric tape and in particular a polymer woven fabric tape enables the resistance of the coating to be improved further.

It goes without saying that the abovementioned features and the features still to be explained below can be employed not only in the combination indicated in each case but also in other combinations or alone without going outside the scope of the present invention.

The invention will be illustrated below with the aid of an example and explained in more detail in the following description.

Example 1

A hydraulically setting mineral composition consisting of 60% by mass of quartz and about 35% of alumina cement (about 26% by mass of $CaAl_2O_4$ and 7% by mass of $Ca_3Al_2O_6$ based on 100% by mass of the dry cement), where the remaining 5% are made up by secondary phases, is mixed with a sufficient amount of a polychloroprene latex (mass ratio of dry cement/latex dispersion=3:1) in order to give a processable mortar. The latex used comprises 40% by weight of polychloroprene and 20% by weight of melamine formaldehyde resin and is stabilized by addition of polyoxyethylene sorbitan trioleate and also further surfactants based on fatty acid polyglycol esters. The cement mortar thus obtained is applied by means of the airless process to an untreated ductile cast iron pipe and cured at room temperature over a period of 3 hours. This gives an about 500 μm thick crack-free closed coating which meets the corrosion protection requirements for pipes laid underground.

In tests on the adhesion of the coating to the ductile cast iron pipe in accordance with DIN EN 15189, it has been found that cracks occur within the coating itself before the coating is torn from the ductile cast iron pipe and only parts of the coating are torn off, with sufficient coating material remaining on the total coated surface of the cast iron pipe to ensure corrosion protection. This clearly demonstrates the superior adhesion of the layer according to the invention. Likewise, it has been found in studies on the impact resistance in accordance with DIN EN 15542 that the coating of the invention has, with an impact resistance of more than 175 Nm, a superior impact resistance. The latter is particularly advantageous when the pipes are bedded using a coarsely particulate bedding material.

The invention claimed is:

1. A ductile cast iron pipe having a surface, at least a part of said surface comprising a coating of a latex-modified cement mortar, wherein said latex-modified cement mortar is a cement mortar comprising a calcium aluminate cement composition that comprises the following:
   at least 5% by mass of $CaAl_2O_4$ based on 100% by mass of dry calcium aluminate cement composition,
   at least 5% by mass of $Ca_3Al_2O_6$ based on 100% by mass of dry calcium aluminate cement composition, and
   at least one inorganic filler.

2. The ductile cast iron pipe of claim 1, wherein said surface comprises an inner cylindrical surface, wherein said coating of a latex-modified cement mortar is at least on part of said inner cylindrical surface.

3. The ductile cast iron pipe of claim 1, wherein said surface comprises an outer cylindrical surface, wherein said coating of a latex-modified cement mortar is at least on part of said outer cylindrical surface.

4. The ductile cast iron pipe of claim 1, wherein said surface comprises an inner cylindrical surface and an outer cylindrical surface, wherein said coating of a latex-modified cement mortar is at least on part of said inner cylindrical surface and said outer cylindrical surface.

5. The ductile cast iron pipe of claim 1, wherein said latex-modified cement mortar further comprising one or more further aluminates.

6. The ductile cast iron pipe of claim 1, wherein said latex-modified cement mortar further comprising auxiliaries, secondary phases and amorphous components.

7. The ductile cast iron pipe of claim 1, wherein said latex-modified cement mortar comprises 5-35% by mass of $CaAl_2O_4$, based on 100% by mass of dry calcium aluminate cement composition.

8. The ductile cast iron pipe of claim 7, wherein said latex-modified cement mortar comprises 15-30% by mass of $CaAl_2O_4$, based on 100% by mass of dry calcium aluminate cement composition.

9. The ductile cast iron pipe of claim 1, wherein said latex-modified cement mortar comprises 5-35% by mass of $Ca_3Al_2O_6$, based on 100% by mass of dry calcium aluminate cement composition.

10. The ductile cast iron pipe of claim 9, wherein said latex-modified cement mortar comprises 5-10% by mass of $Ca_3Al_2O_6$, based on 100% by mass of dry calcium aluminate cement composition.

11. The ductile cast iron pipe of claim 1, wherein said latex-modified cement mortar comprises at least 20% by mass of said at least one inorganic filler, based on 100% by mass of dry calcium aluminate cement composition.

12. The ductile cast iron pipe of claim 1, wherein said latex-modified cement mortar comprises at least 40% by mass of said at least one inorganic filler, based on 100% by mass of dry calcium aluminate cement composition.

13. The ductile cast iron pipe of claim 1, wherein said latex-modified cement mortar comprises 60-70% by mass of said at least one inorganic filler, based on 100% by mass of dry calcium aluminate cement composition.

14. The ductile cast iron pipe of claim 1, wherein said coating has a thickness of not more than 2 mm.

15. The ductile cast iron pipe of claim 1, wherein said coating has a thickness of not more than 500 μm.

16. The ductile cast iron pipe of claim 1, wherein said latex-modified cement mortar is a cement mortar which has been modified with at least one latex selected from among polyisoprene latexes and polychloroprene latexes.

17. The ductile cast iron pipe of claim 1, wherein said latex-modified cement mortar further comprises at least one melamine-formaldehyde resin.

18. The ductile cast iron pipe of claim 1, wherein said latex-modified cement mortar further comprises at least one silane bonding agent.

19. A method for producing a coated ductile cast iron pipe, said method comprising the steps of:
providing a ductile cast iron pipe, said ductile cast iron pipe comprising a surface, and
coating at least part of said surface of said ductile cast iron pipe with a latex-modified cement mortar, wherein said latex-modified cement mortar is a cement mortar comprising a calcium aluminate cement composition that comprises—
at least 5% by mass of $CaAl_2O_4$ based on 100% by mass of dry calcium aluminate cement composition,
at least 5% by mass of $Ca_3Al_2O_6$ based on 100% by mass of dry calcium aluminate cement composition, and
at least one inorganic filler.

20. The method of claim 19, wherein said surface comprises an inner cylindrical surface, and wherein said coating of a latex-modified cement mortar is provided at least on part of said inner cylindrical surface.

21. The method of claim 19, wherein said surface comprises an outer cylindrical surface, and wherein said coating of a latex-modified cement mortar is provided at least on part of said outer cylindrical surface.

22. The method of claim 19, wherein said surface comprises an inner cylindrical surface and an outer cylindrical surface, and wherein said coating of a latex-modified cement mortar is provided at least on part of said inner cylindrical sur-face and part of said outer cylindrical surface.

23. The method of claim 19, wherein said latex-modified cement mortar is applied by spray processes.

24. The method of claim 23, wherein said spray processes are airless spray processes.

25. The method of claim 19, wherein said latex-modified cement mortar is applied by casting processes.

26. The method of claim 25, wherein said casting processes are centrifugal casting processes.

27. The method of claim 19, wherein said latex-modified cement mortar is applied by extrusion processes.

28. The method of claim 19, wherein said coating step is followed by a step comprising wrapping of a nonwoven tape around at least part of said ductile cast iron pipe.

29. The method of claim 19, wherein said coating step is followed by a step comprising wrapping of a woven fabric tape around at least part of said ductile cast iron pipe.

30. The method of claim 29, wherein said woven fabric tape is a polymer woven fabric tape.

* * * * *